US012018513B2

(12) United States Patent
Clifford et al.

(10) Patent No.: US 12,018,513 B2
(45) Date of Patent: Jun. 25, 2024

(54) LOCK STATUS INDICATOR

(71) Applicant: dormakaba USA Inc., Indianapolis, IN (US)

(72) Inventors: Jason C. Clifford, Noblesville, IN (US); Yang Wei, Shenzhen (CN)

(73) Assignee: dormakaba USA Inc., Indianapolis, IN (US)

( * ) Notice: Subject to any disclaimer, the term of this patent is extended or adjusted under 35 U.S.C. 154(b) by 601 days.

(21) Appl. No.: 17/174,652

(22) Filed: Feb. 12, 2021

(65) Prior Publication Data

US 2021/0372162 A1 Dec. 2, 2021

Related U.S. Application Data

(60) Provisional application No. 63/033,806, filed on Jun. 2, 2020.

(51) Int. Cl.

| | |
|---|---|
| ***E05B 15/02*** | (2006.01) |
| ***E05B 41/00*** | (2006.01) |
| *E05B 55/00* | (2006.01) |
| *E05B 63/00* | (2006.01) |

(52) U.S. Cl.
CPC .............. *E05B 41/00* (2013.01); *E05B 15/02* (2013.01); *E05B 55/005* (2013.01); *E05B 63/006* (2013.01)

(58) Field of Classification Search
CPC ........ E05B 41/00; E05B 15/02; E05B 55/005; E05B 63/006; E05B 63/10; E05B 47/0038
See application file for complete search history.

(56) References Cited

U.S. PATENT DOCUMENTS

| | | | | |
|---|---|---|---|---|
| 4,936,896 | A | 6/1990 | Takatsuka | |
| 5,548,984 | A | 8/1996 | Miyatsu | |
| 6,441,735 | B1 | 8/2002 | Marko et al. | |
| 6,883,357 | B1 | 4/2005 | Cheng | |
| 10,563,425 | B2 * | 2/2020 | Lunday | E05B 17/10 |
| 11,359,408 | B2 * | 6/2022 | Kim | E05B 41/00 |
| 11,624,208 | B2 | 4/2023 | Shumaker et al. | |
| 11,795,730 | B2 | 10/2023 | Hood | |
| 2007/0214848 | A1 | 9/2007 | Meyerle et al. | |
| 2015/0315816 | A1 | 11/2015 | Gopalakrishnan et al. | |
| 2017/0342740 | A1 | 11/2017 | Basavaraju et al. | |
| 2019/0234110 | A1 | 8/2019 | Laporta | |
| 2019/0323264 | A1 | 10/2019 | Lunday | |

(Continued)

FOREIGN PATENT DOCUMENTS

| | | | |
|---|---|---|---|
| CA | 3048575 | A1 | 10/2019 |
| CN | 1180780 | A | 5/1998 |
| CN | 105401796 | A | 3/2016 |

(Continued)

OTHER PUBLICATIONS

"Classroom Security Indicator Lever Installation and Operation Instructions", Oak Security Group, LLC, Jun. 28, 2019, 1 page.

(Continued)

*Primary Examiner* — Michael P Ferguson
*Assistant Examiner* — Thomas L Neubauer
(74) *Attorney, Agent, or Firm* — Faegre Drinker Biddle & Reath LLP

(57) ABSTRACT

Lock indicators useable to signal the locked or unlocked state of a lock where the lock indicator is usable with an adjustable rose for accommodating various door thicknesses.

17 Claims, 8 Drawing Sheets

(56) References Cited

U.S. PATENT DOCUMENTS

| | | | |
|---|---|---|---|
| 2020/0291683 | A1 | 9/2020 | Tikkanen et al. |
| 2021/0310278 | A1 | 10/2021 | Hood |

FOREIGN PATENT DOCUMENTS

| | | | |
|---|---|---|---|
| CN | 107060518 | A | 8/2017 |
| CN | 208040078 | U | 11/2018 |
| DE | 202004009405 | U1 | 8/2004 |
| DE | 102019100639 | B3 | 3/2020 |
| EP | 3153192 | A1 | 4/2017 |
| JP | 04-049391 | A | 2/1992 |
| JP | 05-025960 | A | 2/1993 |
| JP | 07-054524 | A | 2/1995 |
| JP | 07-062937 | A | 3/1995 |
| JP | 08-013868 | A | 1/1996 |
| JP | 09-209625 | A | 8/1997 |
| JP | 2002-106220 | A | 4/2002 |
| JP | 2018-145731 | A | 9/2018 |
| RU | 2749442 | C1 | 6/2021 |
| WO | 01/77467 | A1 | 10/2001 |

OTHER PUBLICATIONS

"Vizilok Indicator Lock-Perfect for busy Public Spaces & Business", Vizilok, Online Available at: https:/web.org/web/20181205125356/https://viziok.com, retrieved on Janauary 29, 2024, 5 pages.

* cited by examiner

Fig. 6
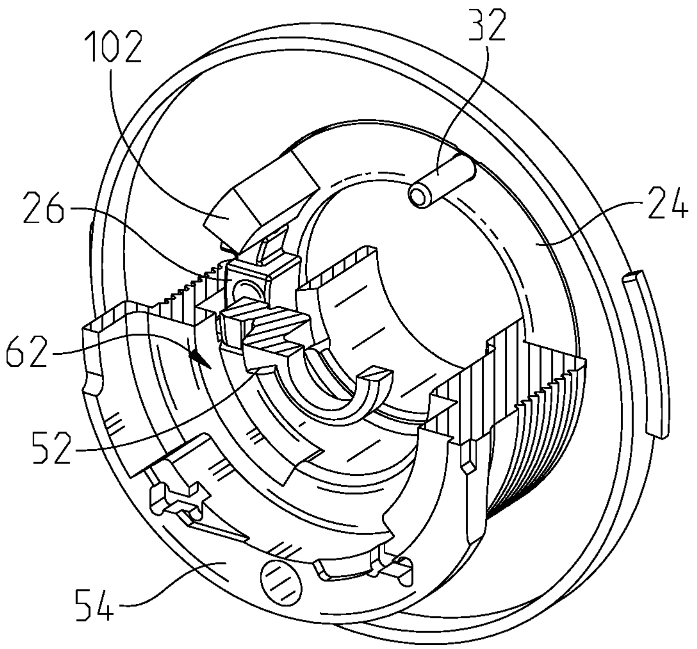
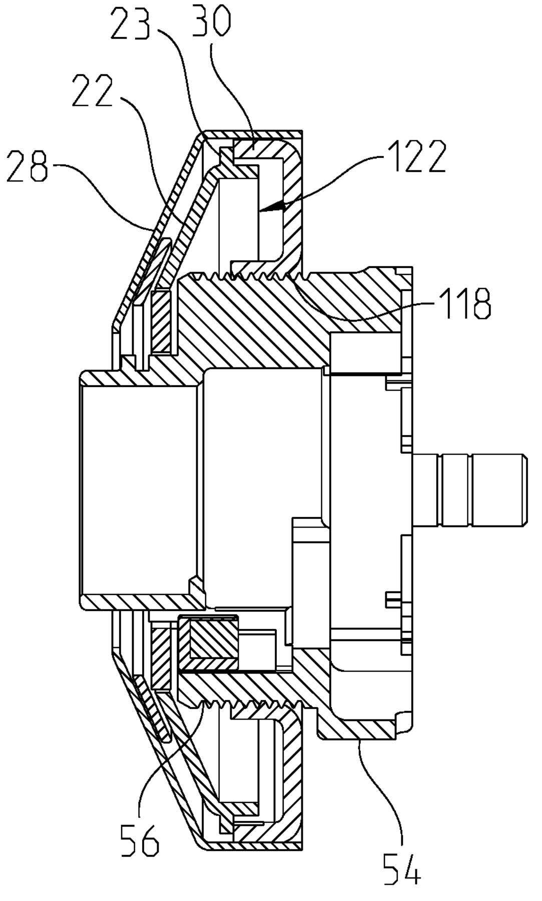
Fig. 7

LOCK STATUS INDICATOR

CROSS REFERENCE TO RELATED APPLICATION

This application claims priority to U.S. Provisional Patent Application No. 63/033,806 filed Jun. 2, 2020, entitled LOCK STATUS INDICATOR, the entire disclosure of which is expressly incorporated by reference herein.

FIELD

The present disclosure relates to door locks and, in particular, to door locks having a lock status indicator.

BACKGROUND

Door locks can take a number of different forms, including cylindrical locks and mortise locks. In certain instances, the door may be placed in a locked state to limit ingress and egress by a lock function. It may be advantageous to signal to occupants or those outside of a space secured by a door that the door lock maintains the locked condition, limiting ingress and/or egress. However, cylindrical locks present unique challenges for transmitting a lock status between ingress and egress sides of a door.

SUMMARY

The present disclosure provides lock indicators useable to signal the locked or unlocked state of a lock at one or both sides of a barrier such as a door selectively secured by the lock. Throughout this document, "inside" will be used to reference the side of a door and lock actuator available to occupants of an area secured by the lock, while "outside" will be used to reference the side of a door and lock actuator available to those seeking ingress to the secured area.

In an exemplification thereof, the present disclosure provides a lock comprising: a hub securable to a barrier, the lock operable to selectively block and permit access through the barrier, the hub having a hub longitudinal axis; a rose assembly, comprising: a flag having a lock indicator and an unlock indicator; and a rose selectively displaying one of the lock indicator and the unlock indicator; the rose assembly selectively secured to the hub at one of a plurality of positions along the hub longitudinal axis; and a flag actuator constrained from movement along the hub longitudinal axis, the flag actuator operable to actuate the flag between a flag lock position in which the rose displays the lock indicator and a flag unlock position in which the rose displays the unlock indicator, the flag actuator operable to actuate the flag between the flag lock position and the flag unlock position when the rose assembly occupies any of the plurality of positions along the hub longitudinal axis.

In an example, the lock further comprises: a locking lug having a locking lug lock position corresponding to a locked condition of the lock, in the locking lug lock position the hub restricting a movement of the locking lug relative to the hub, the locking lug having a locking lug unlock position corresponding to an unlocked condition of the lock, in the locking lug unlock position the hub allowing the movement of the locking lug relative to the hub, the locking lug axially translatable along the hub longitudinal axis between the locking lug lock position and the locking lug unlock position; and a magnet holder, the magnet holder moveable by the locking lug through a magnet holder movement between a magnet holder lock position and a magnet holder unlock position, the flag actuator magnetically actuatable by the magnet holder to actuate the flag between the flag lock position in which the rose displays the lock indicator and the flag unlock position in which the rose displays the unlock indicator.

In an example, the rose assembly further comprises: a rose liner, the rose liner selectively securable to the rose, the rose liner threadedly connected to the hub, the rose liner rotatable relative to the hub to place the rose assembly in one of the plurality of positions along the hub longitudinal axis, the flag sandwiched between the rose liner and the rose.

In an example, the the flag comprises a retainer rotationally constraining the flag to the flag actuator, the retainer sized and shaped to rotationally constrain the flag to the flag actuator at each of the plurality of positions of the rose assembly along the hub longitudinal axis.

In an exemplary embodiment thereof, the present disclosure provides A lock comprising: a hub having a hub longitudinal axis; a moveable cuff capable of undergoing a movement between a first cuff position and a second cuff position, the movement of the moveable cuff guided by the hub; a flag having a lock indicator and an unlock indicator, the flag moveable by the cuff between a lock flag position displaying the lock indicator and an unlock flag position displaying the unlock indicator, the movement of the moveable cuff actuating the flag between the lock flag position and the unlock flag position; and a rose at least partially covering the flag, the rose selectively securable relative to the hub in a first rose position and selectively securable to the hub in a second rose position spaced a distance from the first rose position along the hub longitudinal axis, whereby the rose can be positioned in one of the first rose position and the second rose position at installation of the lock, the flag secured for movement with the rose between a first flag position and a second flag position spaced from the first flag position along the hub longitudinal axis, the cuff spaced a first distance along the hub longitudinal axis from the lock indicator and the unlock indicator in the first flag position, the cuff spaced a second distance larger than the first distance along the hub longitudinal axis from the lock indicator and the unlock indicator in the second flag position, the moveable cuff operable to actuate the flag between the lock position and the unlock position in both the first flag position and the second flag position.

In an example, the lock further comprises: a locking lug having a locking lug lock position corresponding to a locked condition of the lock, in the locking lug lock position the hub restricting a movement of the locking lug relative to the hub, the locking lug having a locking lug unlock position corresponding to an unlocked condition of the lock, in the locking lug unlock position the hub allowing the movement of the locking lug relative to the hub, the locking lug axially translatable along the hub longitudinal axis between the locking lug lock position and the locking lug unlock position; and a magnet holder, the magnet holder moveable by the locking lug through a magnet holder movement between a magnet holder lock position and a magnet holder unlock position, the moveable cuff magnetically actuatable by the magnet holder between the first cuff position and the second cuff position, the magnet holder movement actuating the moveable cuff between the first cuff position and the second cuff position.

In an example, the lock further comprises: a rose liner, the rose liner selectively securable to the rose, the rose liner selectively securable relative to the hub in a first rose liner position and selectively securable to the hub in a second rose liner position spaced from the first rose liner position along the hub longitudinal axis, the rose securable to the rose liner, with the rose secured to the rose liner and the rose liner maintaining the first rose liner position, the rose maintains the first rose liner position, with the rose secured to the rose liner and the rose liner maintaining the second rose liner position, the rose maintains the second rose liner position, the flag sandwiched between the rose liner and the rose.

In an example, the rose liner is threadedly connected to the hub, the rose liner rotatable relative to the hub between the first rose liner position and the second rose liner position.

In an example thereof, the rose comprises a window, the lock indicator visible through the window in the lock flag position, the unlock indicator visible through the window in the unlock flag position.

In an example thereof, the cuff is constrained against axial movement along the hub longitudinal axis.

In an example thereof, the movement of the moveable cuff comprises a rotation about the hub.

In an example thereof, the flag comprises a retainer rotationally constraining the flag to the cuff, the retainer having a length measured along the hub longitudinal axis, the length of the retainer longer than the distance between the first rose position and the second rose position.

In a further exemplification thereof, the present disclosure provides a lock comprising: a hub having a hub longitudinal axis; a moveable cuff constrained against axial movement relative to the hub longitudinal axis, the moveable cuff rotatable about the hub longitudinal axis and capable of undergoing a movement between a first cuff position and a second cuff position; a flag having a lock indicator and an unlock indicator, the flag moveable by the cuff between a lock flag position displaying the lock indicator and an unlock flag position displaying the unlock indicator, the movement of the moveable cuff actuating the flag between the lock flag position and the unlock flag position; and a rose at least partially covering the flag, the rose selectively securable relative to the hub in a first rose position and selectively securable to the hub in a second rose position spaced a distance from the first rose position along the hub longitudinal axis, whereby the rose can be positioned in one of the first rose position and the second rose position at installation of the lock, the flag secured for movement with the rose between a first flag position and a second flag position spaced from the first flag position along the hub longitudinal axis, the cuff spaced a first distance along the hub longitudinal axis from the lock indicator and the unlock indicator in the first flag position, the cuff spaced a second distance larger than the first distance along the hub longitudinal axis from the lock indicator and the unlock indicator in the second flag position, the moveable cuff operable to actuate the flag between the lock position and the unlock position in both the first flag position and the second flag position.

In an example thereof, the lock further comprises: a locking lug having a locking lug lock position corresponding to a locked condition of the lock, in the locking lug lock position the hub restricting a movement of the locking lug relative to the hub, the locking lug having a locking lug unlock position corresponding to an unlocked condition of the lock, in the locking lug unlock position the hub allowing the movement of the locking lug relative to the hub, the locking lug axially translatable along the hub longitudinal axis between the locking lug lock position and the locking lug unlock position; and a magnet holder, the magnet holder moveable by the locking lug through a magnet holder movement between a magnet holder lock position and a magnet holder unlock position, the moveable cuff magnetically actuatable by the magnet holder between the first cuff position and the second cuff position, the magnet holder movement actuating the moveable cuff between the first cuff position and the second cuff position.

In an example, the lock further comprises: a rose liner, the rose liner selectively securable to the rose, the rose liner selectively securable relative to the hub in a first rose liner position and selectively securable to the hub in a second rose liner position spaced from the first rose liner position along the hub longitudinal axis, the rose securable to the rose liner, with the rose secured to the rose liner and the rose liner maintaining the first rose liner position, the rose maintains the first rose liner position, with the rose secured to the rose liner and the rose liner maintaining the second rose liner position, the rose maintains the second rose liner position, the flag sandwiched between the rose liner and the rose.

In an example thereof, the rose liner is threadedly connected to the hub, the rose liner rotatable relative to the hub between the first rose liner position and the second rose liner position.

In an example thereof, the rose comprises a window, the lock indicator visible through the window in the lock flag position, the unlock indicator visible through the window in the unlock flag position.

In an example, the cuff is constrained against axial movement along the hub longitudinal axis.

In an example, the movement of the moveable cuff comprises a rotation about the hub.

In an example, the flag comprises a retainer rotationally constraining the flag to the cuff, the retainer having a length measured along the hub longitudinal axis, the length of the retainer longer than the distance between the first rose position and the second rose position.

In an exemplary embodiment of the present disclosure, an adjustable-width cylindrical lock for mounting to a door is provided, the adjustable-width cylindrical lock comprising: a latch bolt moveable between an engaged position operable to limit ingress and egress and a disengaged position operable to permit ingress and egress; a first actuator operable to receive a first operator input motion to actuate the first actuator to move the latch bolt from the engaged position to the disengaged position; a second actuator operable to receive a second operator input motion to actuate the second actuator to move the latch bolt from the engaged position to the disengaged position; a hub coupled to the door and having a longitudinal axis and a lock channel; a locking lug positioned in the hub, the locking lug being in the locked position when a portion of the locking lug is positioned in the lock channel of the hub, and the locking lug being in the unlocked position when the locking lug is not positioned in the lock channel of the hub; a rose selectively securable to the hub at a first position along the longitudinal axis, the rose selectively securable to the hub at a second position different from the first position along the longitudinal axis; and a flag having a lock signal signaling the locked position of the locking lug and an unlock signal signaling the unlocked position of the locking lug, the flag selectively displaying only one of the lock signal and the unlock signal, the flag spaced a first distance from the rose when the rose maintains the first position, the flag also spaced the first distance from the rose when the rose maintains the second position.

In an exemplary embodiment of the present disclosure, a lock indicator assembly for a cylindrical lock is provided, the lock indicator assembly comprising: a lock input actuatable between a locked position and an unlocked position, the locked position of the lock input positioning the cylindrical lock in a locked condition; a cuff operably coupled to the lock input and operable to transition between a first position associated with the locked position of the lock input and a second position associated with the unlocked position of the lock input; a rose operable to be positioned exterior to the cuff and to be adjusted to a thickness of a door, the rose operable to be positioned in various longitudinal positions relative to the door, the rose including at least one window; and a flag operably coupled to the cuff to transition between the first position associated with the locked position of the lock input and the second position associated with the unlocked position of the lock input, the flag operable to display a locked status and an unlocked status of the cylindrical lock through the at least one window of the rose, the flag positioned with a fixed distance relative to the rose irrespective of the position of the rose relative to the door.

In an exemplary embodiment of the present disclosure, a lock indicator assembly for a cylindrical lock is provided, the lock indicator assembly comprising: a lock input actuatable between a locked position and an unlocked position, the locked position of the lock input positioning the cylindrical lock in a locked condition; a magnet holder removably coupled to the lock input, the magnet holder operable to translate with the lock input when the lock input is transitioned between the locked position and the unlocked position; a cuff actuatable by the magnet holder between a locked status position associated with the locked position of the lock input and an unlocked status position associated with the unlocked position of the lock; and a flag operably coupled to the cuff, the flag operable to display a locked status and an unlocked status of the cylindrical lock.

In an exemplary embodiment of the present disclosure, a lock indicator mechanism for a lock on a door comprises: a lock input including a lug having an engagement portion transitionable between a locked position and an unlocked position, the engagement portion limiting movement of the lock input when in the locked position; a cuff rotatably positioned with the lock input, the cuff including a plurality of cuff magnets defining a first magnetic field and a second magnetic field; a magnet holder including at least one magnet holder magnet, the magnet holder operably coupled to the lug such that when the lug is positioned in the corresponding locked position, the at least one magnet holder magnet interacts with the first magnetic field causing the cuff to rotate to a first cuff position, and such that when the lug is positioned in the corresponding unlocked position, the at least one magnet holder magnet interacts with the second magnetic field causing the cuff to rotate to a second cuff position; and a lock indicator operably coupled with the cuff such that the lock indicator rotates with the cuff and is operable to display a locked status and an unlocked status.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 6 is a partial sectional view of a hub with a locking lug positioned in the hub, the locking lug operably coupled to a magnetically driven lock indicator assembly, according to one embodiment;

FIG. 7 is a sectional side view of an adjustable rose coupled to a hub, according to one embodiment;

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
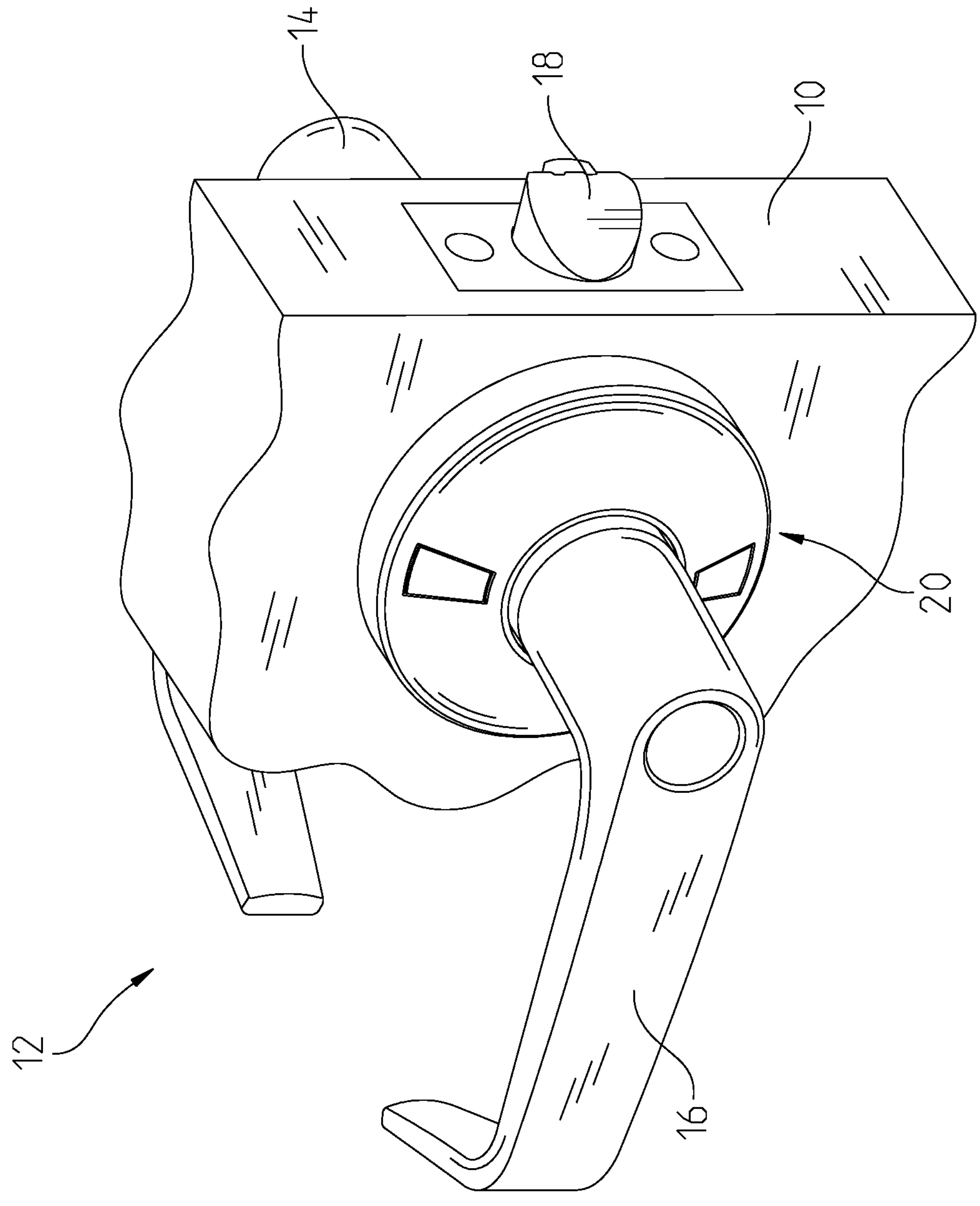
FIG. 1 is a perspective view of door lock mounted on a door, the door lock including a lock indicator system, according to one embodiment.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof may be used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, may be used in reference to various components or features. Such use is not intended to denote an ordering of the components or features. Rather, numeric terminology is used to assist the reader in identifying the component or features being referenced and should not be narrowly interpreted as providing a specific order of components or features.

FIG. 1 illustrates a barrier exemplified as door 10 having door lock 12. As illustrated, door lock 12 is exemplified as a cylindrical lock. Cylindrical locks are well known in the art; therefore, in the description that follows only certain details of the exemplary locks are described in detail, with the detailed description instead focusing on the indicator apparatus and associated method of use.

As illustrated in FIG. 1, door lock 12 includes an egress actuator exemplified as egress handle 14. Door lock 12 further includes an ingress actuator exemplified as ingress handle 16. Door lock 12 is operably coupled to door 10. Door 10 is, in use, arranged to selectively allow and disallow ingress and egress from an area selectively covered by door 10. In an exemplification, door 10 can be hinged to a doorframe and can be selectively secured thereto by latch bolt 18, as is well known in the art. In an unlocked state of door lock 12, both egress handle 14 and ingress handle 16 can be actuated by an operator input motion to move latch bolt 18 from the extended position illustrated in FIG. 1 to a retracted position allowing ingress and egress through door 10. When one of egress handle 14 and ingress handle 16 is actuated to move latch bolt 18 to the retracted position, door 10 can be moved relative to its doorframe to allow ingress and egress therethrough. Translation of rotational movement of egress handle 14 and ingress handle 16 to retraction of latch bolt 18 is well known in the art and is therefore not described for the sake of brevity. In its simplest form such a mechanism can take the form of a cam rotated by ingress handle 16 or egress handle 14 to reciprocate latch bolt 38 between its extended and retracted positions.

Figure 2:
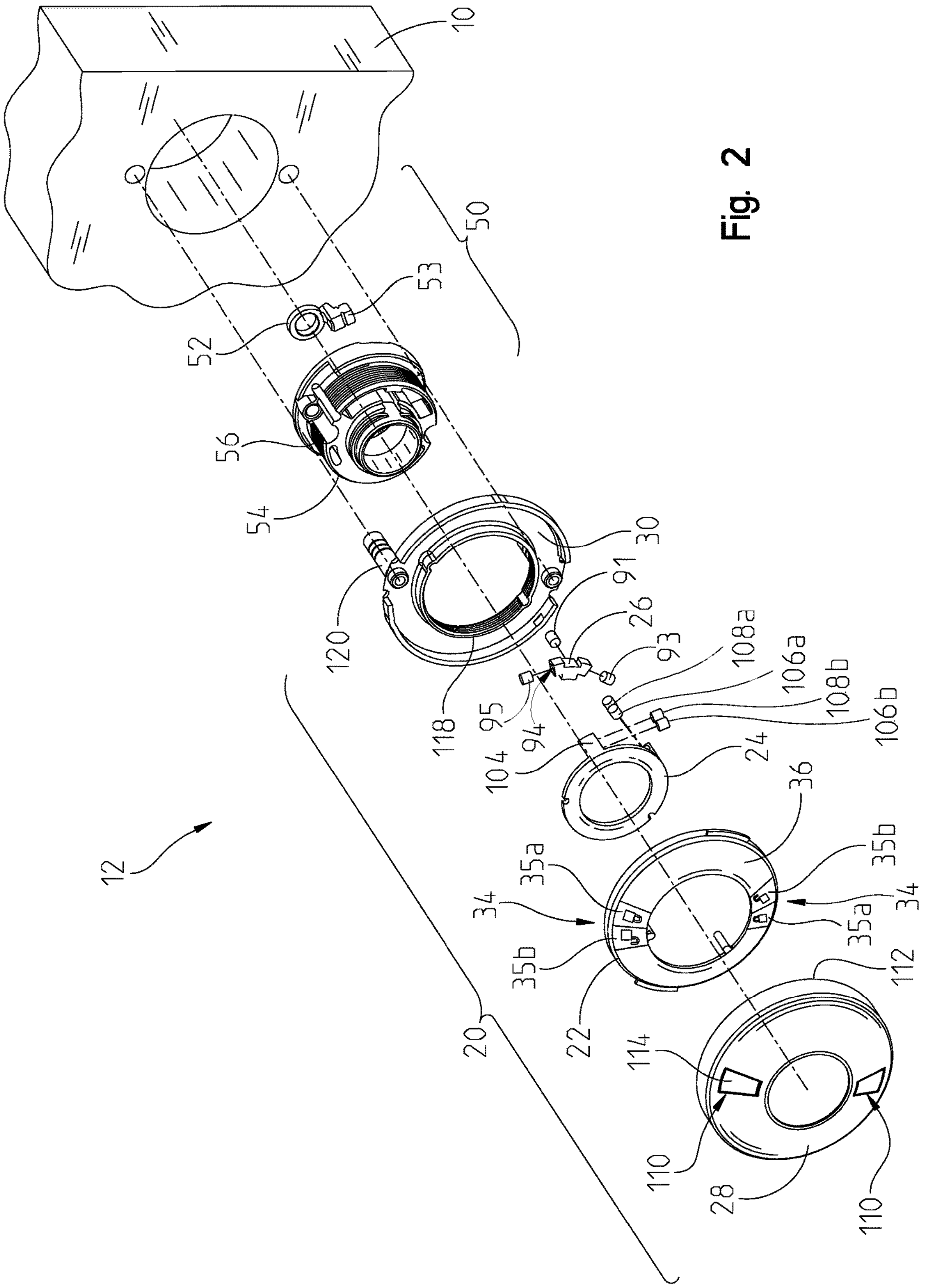
FIG. 2 an exploded view of a lock assembly and lock indicator assembly, according to one embodiment.
Figure 3:
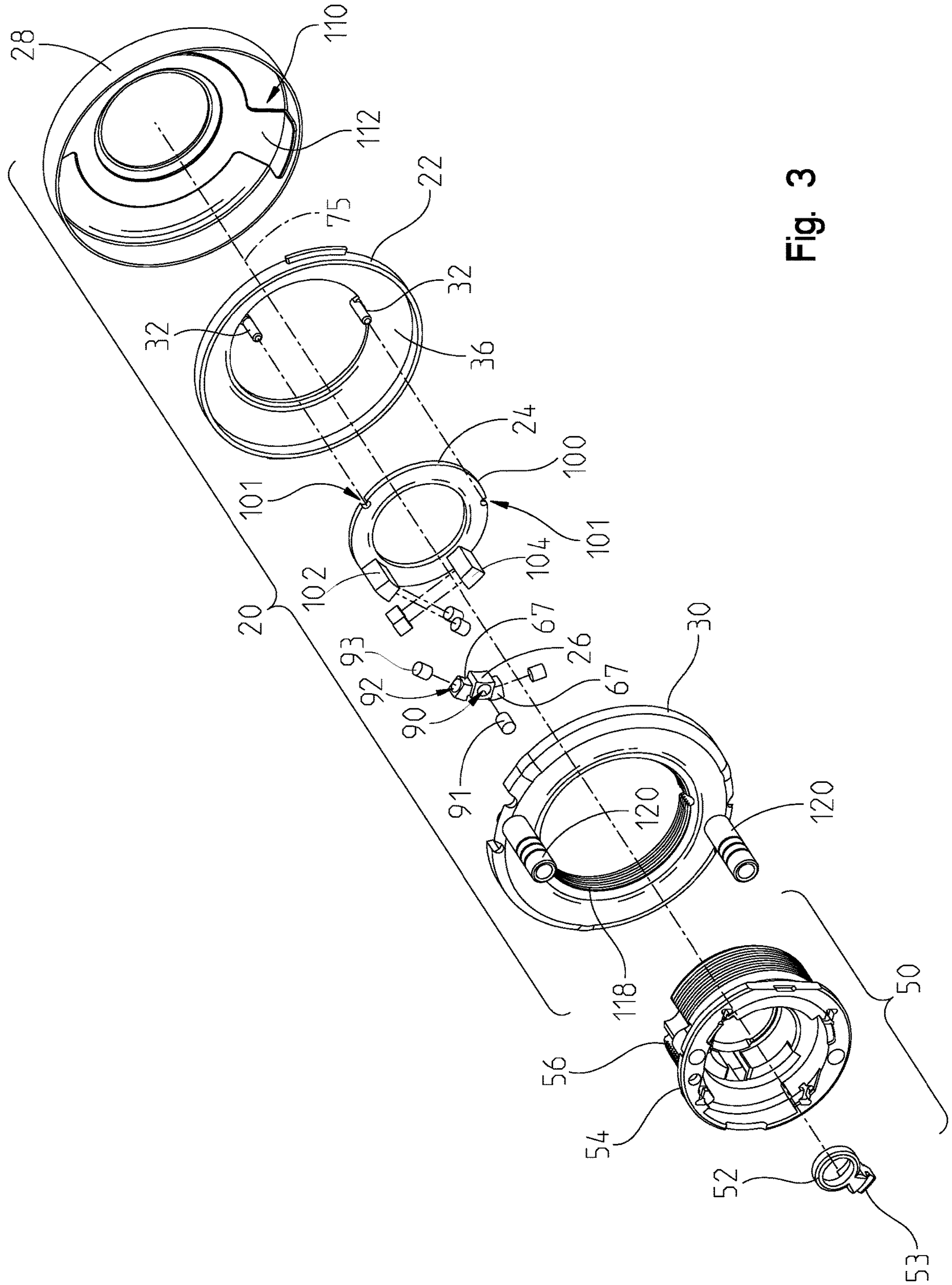
FIG. 3 is an alternate exploded view of the lock assembly and lock indicator assembly of FIG. 2, according to one embodiment.

Referring to FIGS. 2 and 3, door lock 12 includes lock indicator assembly 20 and locking assembly 50. Lock indicator assembly 20 is operable to display to a user the lock status of door lock 12 (e.g., a locked status or an unlocked status) and may be placed on either side of door 10, and in some embodiments, on both sides of door 10. Lock indicator assembly 20 transitions between displaying a locked status and an unlocked status when either an interior lock input or an exterior lock input of door lock 12 are implemented. Door lock 12 is transitioned between the locked condition and the unlocked condition via the locking assembly 50. Locking assembly 50 actuates lock indicator assembly 20 as door lock 12 is transitioned between the locked and the unlocked conditions. Lock indicator assembly 20 can be installed on doors of varying thicknesses.

As seen in FIGS. 2 and 3, lock indicator assembly 20 includes flag 22, cuff 24, magnet holder 26, rose 28, and rose liner 30, as will be discussed hereafter. Lock indicator assembly 20 is magnetically-driven such that when the lock condition of door lock 12 is transitioned between a locked condition and an unlocked condition, lock indicator assembly 20 is actuated via magnetic fields to transition between a first position and a second position. Components of lock indicator assembly 20 directly interface to components of the locking assembly 50. As locking assembly 50 is manipulated, lock indicator assembly 20 is actuated or driven directly by at least one of the components of locking assembly 50 that provides the mechanical interference resulting in the lock condition. In other embodiments, lock indicator assembly 20 is coupled to other components of locking assembly 50 that provide the locking function, but do not provide the mechanical interference resulting in the lock condition (e.g., a lock input). Because operation of locking assembly 50 from the lock input to locking lug 52 (described further below) is well known to persons having ordinary skill in the art, it is not described here for the sake of brevity. Additional description of various cylindrical locks, including entrance, privacy, and intruder locks can be found in U.S. Provisional Patent Application Ser. No. 63/005,886 filed Apr. 6, 2020 and the U.S. utility application as, entitled CYLINDRICAL LOCK STATUS INDICATOR and filed on even date herewith, the entire disclosures of which are hereby incorporated by reference in their entireties.

An overview of components of locking assembly 50 is provided to facilitate an understanding of how lock indicator assembly 20 functions with respect to locking assembly 50. A description of the lock indicator assembly 20 will follow. Finally, a description of the interaction between lock indicator assembly 20 and locking assembly 50 is provided.

Figure 4A:
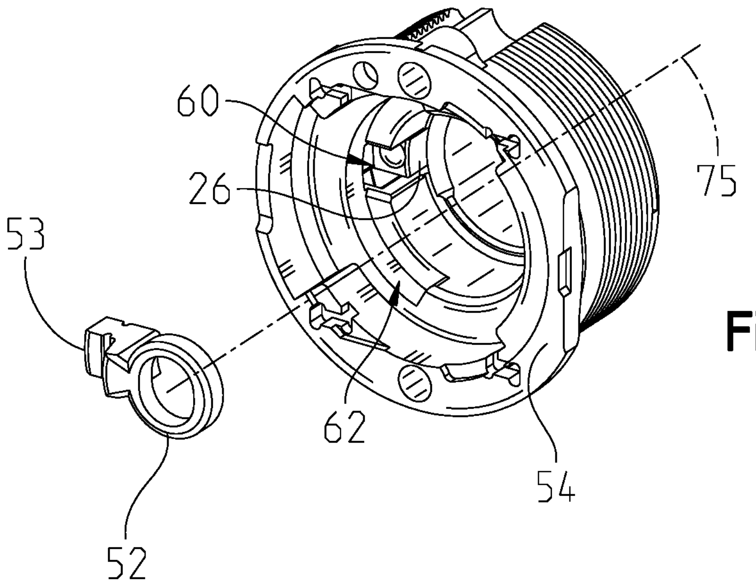
FIG. 4A is an exploded view of a lock assembly including a hub and a locking lug, according to one embodiment.

Referring to FIG. 4A, locking assembly 50 includes locking lug 52 and hub 54. As many components of locking assembly 50 with respect to cylindrical locks are known, for the sake of brevity those components specific to the translation of operator input motion from handles 14, 16 to actuate latch bolt 18 are not discussed herein. Instead, those components that specifically relate to lock indicator assembly 20 are provided. For example, locked and unlocked conditions are achieved by locking lug 52 and hub 54 (e.g., hub 54 provides mechanical interference against predefined movements of locking lug 52), where locking lug 52 also actuates lock indicator assembly 20 to display a locked status or an unlocked status, respectively. For example, locking lug 52 includes engagement portion 53, which engages portions of hub 54 to place door lock 12 in a locked condition. Furthermore, engagement portion 53 also engages with lock indicator assembly 20 (e.g., magnet holder 26), as is described in more detail with respect to lock indicator assembly 20. In some embodiments, engagement portion 53 is formed of a ferromagnetic material, such that a magnet releasably couples to engagement portion 53 of locking lug 52. Optionally, engagement portion 53 may include a lug magnet (e.g., a permanent magnet, not shown) coupled to, embedded in, integral with, or otherwise extending from locking lug 52.

Hub 54 is both rotationally and translationally fixed relative to the door (FIG. 1) and longitudinal axis 75 extending through hub 54. Locking lug 52 is moveable relative to hub 54, such that when locking lug 52 is in a first position, egress and/or ingress handles 14, 16 may be actuated to unlatch latch bolt 18, and when locking lug 52 is in a second position, operator input motion to egress and/or ingress handles 14, 16 (FIG. 1) is blocked and does not allow unlatching of latch bolt 18 (FIG. 1) from a frame to allow access through door 10. Locking lug 52 is, in certain embodiments, positioned to rotate with one or both of handles 14, 16 so that positioning locking lug 52 against rotation with hub 54 locks one or both handles 14, 16 of lock 12.

Figure 4B:
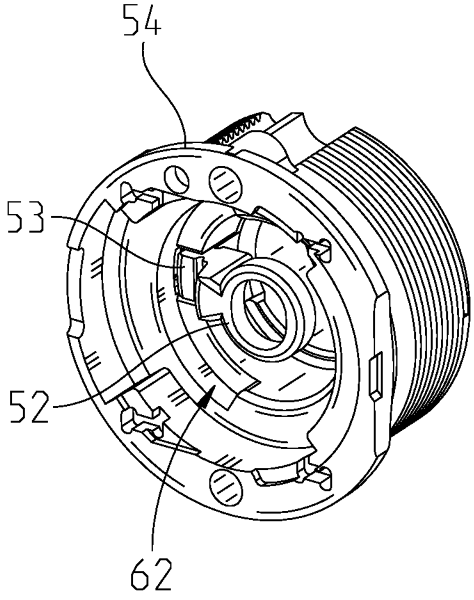
FIG. 4B is a perspective view of the lock assembly of FIG. 4A, where the locking lug is positioned in a lock channel of the hub, according to one embodiment.

Referring to FIG. 4A, hub 54 includes lock channel 60 and unlock channel 62. Lock channel 60 is formed by walls that define a longitudinal slot. Unlock channel 62 is formed within hub 54 and defines an arcuate groove. When engagement portion 53 of locking lug 52 is positioned in lock channel 60 (FIG. 4B), locking lug 52 is restricted from rotational movement relative to hub 54, which results in the blocking of operator input motion applied to the respective handle 14, 16 from actuating latch bolt 18 (FIG. 1). When engagement portion 53 of locking lug 52 is positioned in unlock channel 62 (e.g., by translating the portions of locking assembly 50 along longitudinal axis 75, shown in FIG. 4C), locking lug 52 is free to rotate within the arcuate groove of unlock channel 62, which allows operator input motion applied to the respective handle 14, 16 to translate into actuation of latch bolt 18 (FIG. 1). As locking lug 52 moves between a first linear position (e.g., within lock channel 60, shown in FIGS. 4A and 4B) and a second linear position (e.g., within unlock channel 62, shown in FIGS. 4A and 4C), the lock status of door lock 12 changes.

Figure 9:
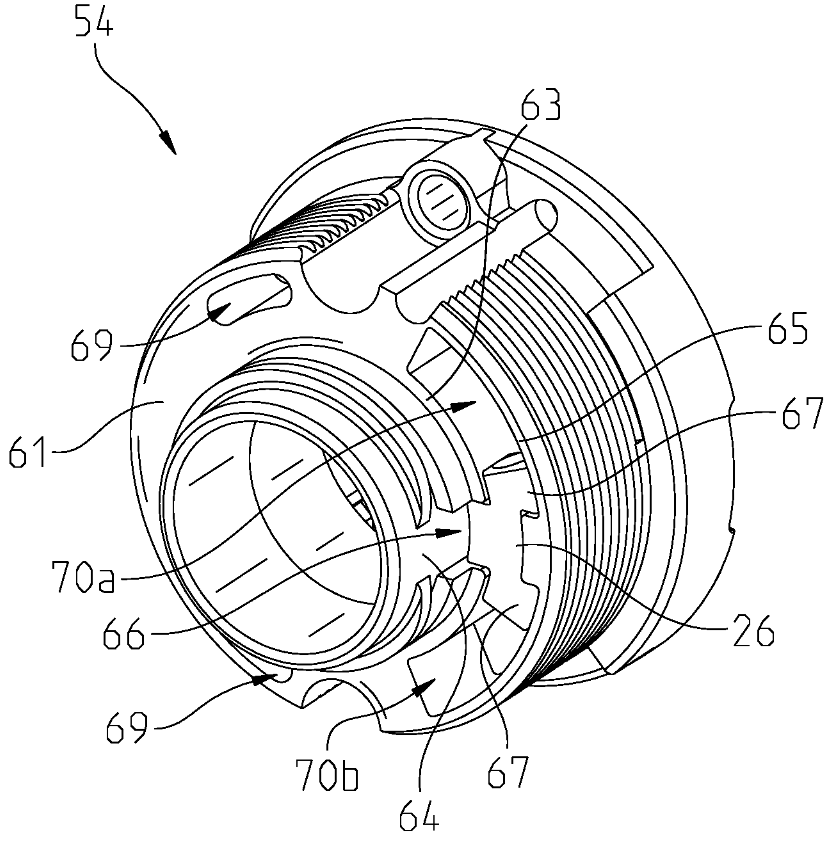
FIG. 9 is a perspective view of a hub including a magnet holder channel, cuff channels, and stop channels, where a magnet holder is positioned in the magnet holder channel, according to one embodiment.

With further reference to FIGS. 4A-4C, 8 and 9, hub 54 includes features that cooperate with components of lock indicator assembly 20. For example, hub 54 includes magnet holder channel 66 defined through interior wall 63 of hub 54 (FIG. 9). Magnet holder channel 66 is formed extending longitudinally along a portion of the body of hub 54. Magnet holder channel 66 receives magnet holder 26 of lock indicator assembly 20. In order to receive magnet holder 26, magnet holder channel 66 is shaped to at least partially match the exterior profile of magnet holder 26 to prevent rotational movement or any other movement except linear movement along, i.e., substantially (within tolerance) parallel to longitudinal axis 75, such that magnet holder 26 is able transition linearly from a first position to a second position within the magnet holder channel 66. In some embodiments, magnet holder channel 66 is positioned proximate lock channel 60 (e.g., at a similar circumferential position, where magnet holder channel 66 is defined between interior wall 63 and exterior wall 65 of hub 54, and lock channel 60 is defined in interior wall 63 of the hub 54 (FIGS. 9 and 10)).

Figure 4C:
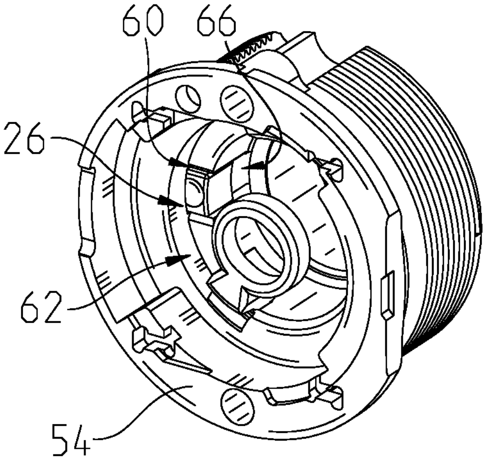
FIG. 4C is a perspective view of the lock assembly of FIGS. 4A and 4B, where the locking lug is positioned in an unlock channel of the hub, according to one embodiment.
Figure 10:
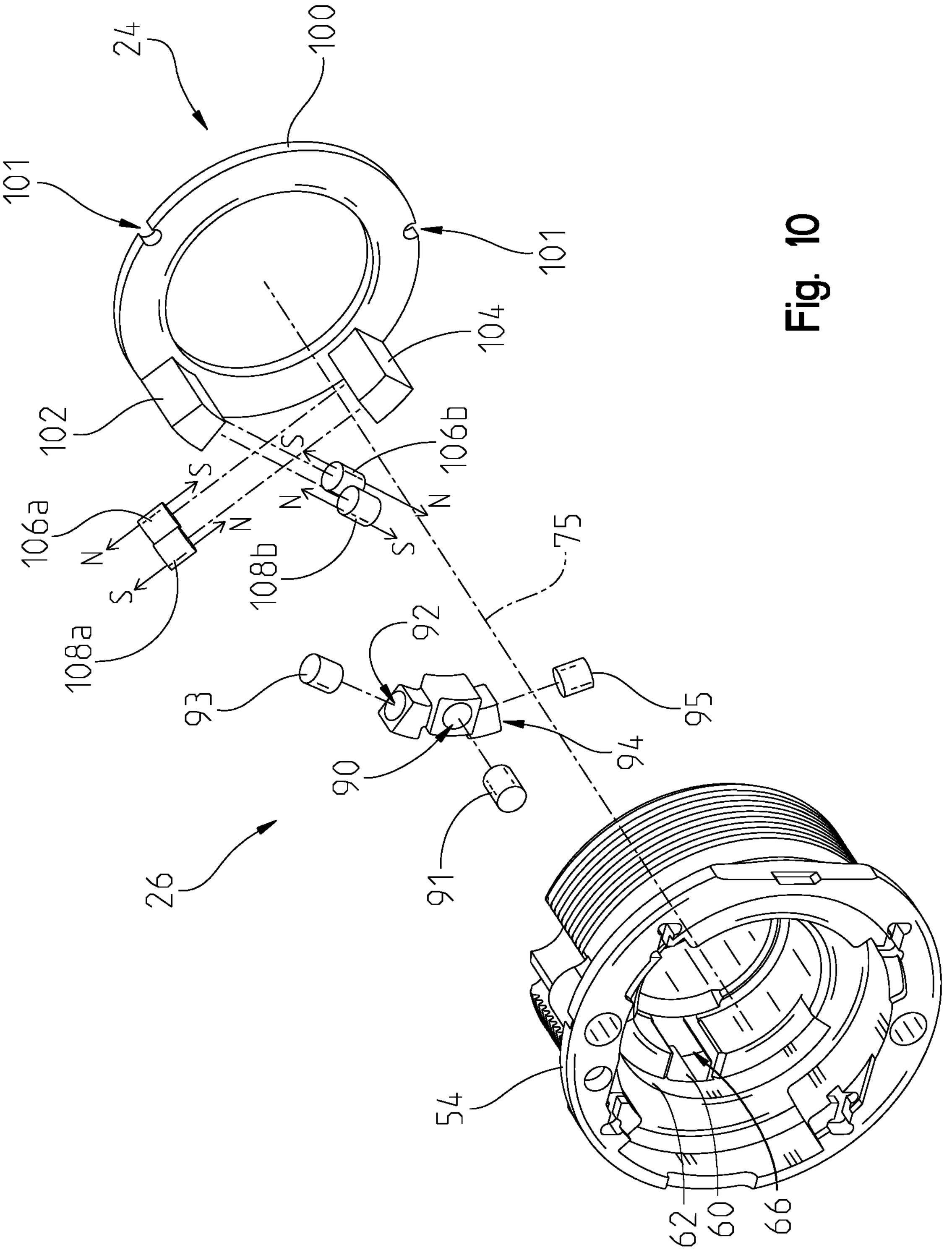
FIG. 10 is an exploded, perspective view of a hub, magnet holder, and cuff, according to one embodiment.

Referring to FIG. 4C, magnet holder channel 66 and lock channel 60 intersect. Magnet holder channel 66 and lock channel 60 are defined in hub 54 at positions such that an aperture is formed through interior wall 63 (FIG. 8) of hub 54 where magnet holder channel 66 and lock channel 60 intersect (FIG. 10). Magnet holder channel 66 includes portions that do not extend all the way through interior walls 63 of hub 54. For example, FIG. 9 shows magnet holder channel 66 which includes lateral portions that are defined in the body of the hub 54, defined between interior and exterior walls 63, 65. FIG. 9 further illustrates magnet holder 26 positioned within magnet holder channel 66 (not labelled because magnet holder 26 fills magnet holder channel 66), wherein lateral portions 67 of magnet holder 26 are positioned in magnet holder channel 66 defined between interior and exterior walls 63, 65 of hub. Portions of magnet holder channel 66 are also intersecting and coextensive with portions of cuff channel 70, which is described hereafter. Optionally, magnet holder channel 66 and cuff channel 70 may be separate such that they are not intersecting, nor coextensive.

Figure 5:
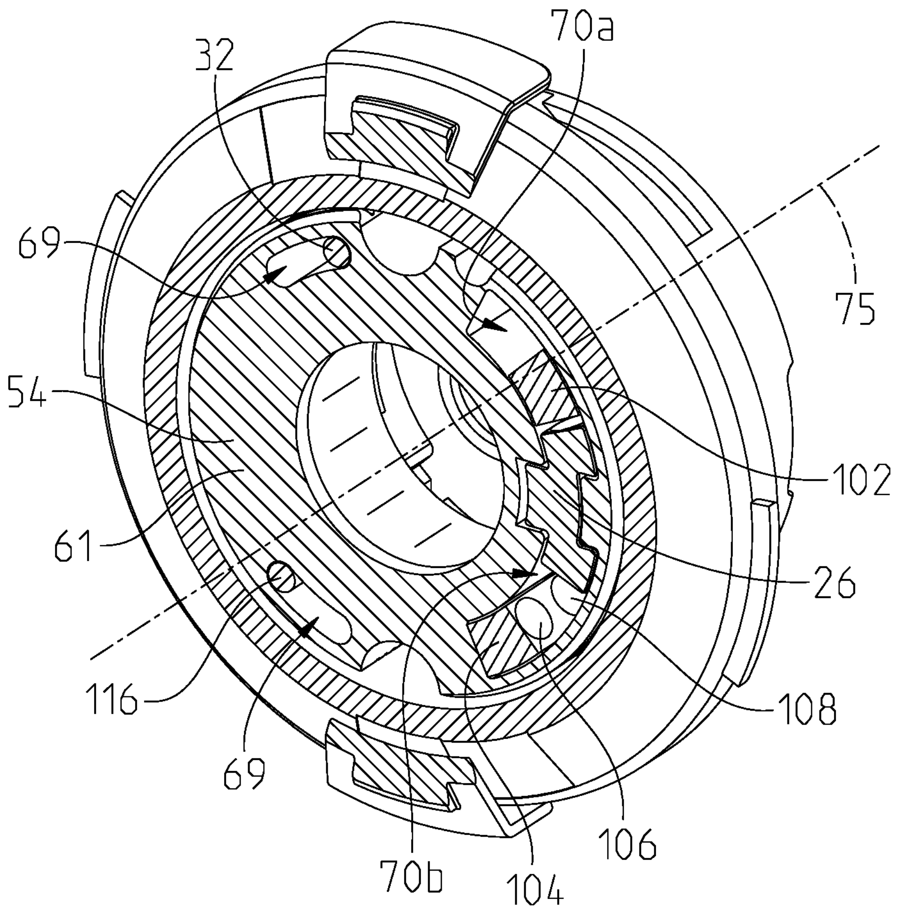
FIG. 5 is sectional view of components of a lock indicator assembly positioned with an interior lock assembly, according to one embodiment.
Figure 8:
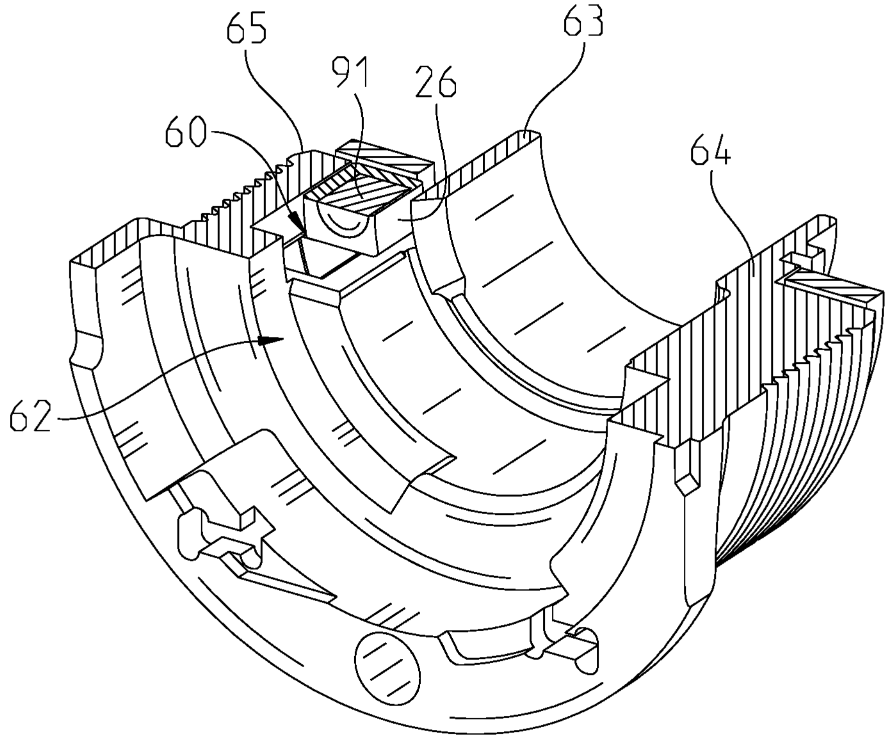
FIG. 8 is sectional view of a hub with a lock and an unlock channel, where a magnet holder is positioned relative to the hub, according to one embodiment.

Referring to FIGS. 5 and 9, hub 54 further includes cuff channel 70*a*, 70*b* positioned at one of the longitudinal ends of hub 54 and extending longitudinally into body of hub 54. Cuff channel 70 forms an arcuate groove defined within body of hub 54 and receives a portion of cuff 24. Cuff channel 70 is positioned coaxially with hub 54 about longitudinal axis 75 and is formed to allow cuff 24 to travel a predefined distance within cuff channel 70. In some embodiments, cuff channel 70 includes first cuff channel 70*a* and second cuff channel 70*b* positioned such that first and second cuff channels 70*a*, 70*b* are positioned on each side of magnet holder channel 66. For example, first cuff channel 70*a* is positioned proximate a first side of magnet holder channel 66 and second cuff channel 70*b* is positioned proximate a second side of magnet holder channel 66. Portions of the cuff channels 70*a*, 70*b* intersect with magnet holder channel 66.

Hub 54 further includes hub threaded portion 56 (FIG. 3). Hub threaded portion 56 is positioned spaced from door 10 when hub 54 is secured to door 10. Hub threaded portion 56 is discussed further with relation to lock indicator assembly 20, and specifically rose 28 and rose liner 30.

Turning to a discussion of lock indicator assembly 20, and as shown in FIGS. 2 and 3, lock indicator assembly 20 includes flag 22, cuff 24, magnet holder 26, rose 28, and rose liner 30, as previously introduced. Referring to FIG. 10, cuff 24 and magnet holder 26 cooperate to drive flag 22 for displaying the lock status of door lock 12. Magnet holder 26 includes magnet receivers 90, 92, 94 for receiving permanent magnets 91, 93, 95 that generate a coupling magnetic field operable to interact with engagement portion 53 of locking lug 52 and generate a lock indicator magnetic field that is operable to interact with magnetic fields associated with cuff 24. In one example, magnet holder 26 includes first receiver 90 for receiving first permanent magnet 91, second receiver 92 for receiving second permanent magnet 93, and third receiver 94 for receiving third permanent magnet 95. First permanent magnet 91 is disposed such that it primarily interacts with engagement portion 53 of locking lug 52. Longitudinal axes of second and third permanent magnets 93, 95 are disposed such that they primarily interact with permanent magnets 106, 108 (FIG. 10) of extension portions 102, 104 of cuff 24. Second and third permanent magnets 93, 95 are disposed substantially along an arcuate path that matches an arcuate path defined by cuff channel 70 (FIGS. 5 and 9) of hub 54 such that the magnetic fields generated by permanent magnets 93, 95 are at least partially disposed within the arcuate path of cuff channel 70. A longitudinal axis of first permanent magnet 91 is positioned at a substantially 90-degree angle to the longitudinal axes of second and third permanent magnets 93, 95, such that first permanent magnet 91 is oriented radially relative to the arcuate path of cuff channel 70. In some embodiments, the permanent magnets may be integrated directly into magnet holder 26 or may form at least a portion of magnet holder 26. Magnet holder 26 is received within magnet holder channel 66 of hub 54.

Cuff 24 includes cap 100 (FIG. 10) which is positioned coaxially relative to hub 54. In some embodiments, cap 100 is circular, but may include other shapes (e.g., arcuate-shaped and ring-shaped). Cuff 24 includes first extension portion 102 and second extension portion 104 that extend from cap 100 (FIGS. 3 and 10). First and second extension portions 102, 104 are configured to be received into cuff channel 70 of hub 54. Cuff channel 70 of hub 54 includes an arc length longer than the arc length defined between first and second extension portions 102, 104 along substantially the same radius of curvature, allowing cuff 24 to rotate about longitudinal axis 75 and transition between various positions relative to hub 54 when first and second extension portions 102, 104 are received in cuff channel 70.

Permanent magnets 106, 108 of first and second extension portions 102, 104 of cuff 24 generate a first operative magnetic field disposed at a first longitudinal position and a second operative magnetic field at a second longitudinal position along axis 75. The first operative magnetic field is formed by first and second permanent magnets 106*a*, 106*b* positioned with first and second extension portions 102, 104 at a first longitudinal position. For example, first permanent magnets 106*a*, 106*b* generate the first operative magnetic field at the first longitudinal position. First and second permanent magnets 106*a*, 106*b* each have north and south poles, wherein the like poles are oriented toward each other along the arcuate path. The second operative magnetic field is formed by permanent magnets 108 positioned with first and second extension portions 102, 104 at a second longitudinal position. For example, third and fourth permanent magnets 108*a*, 108*b* generate the second operative magnetic field at the second longitudinal position. Third and fourth permanent magnets 108*a*, 108*b* each have north and south poles, with the like poles oriented toward each other along the arcuate path such that the poles that are oriented towards each other are different from the poles of first and second permanent magnets 106*a*, 106*b* of the first operative magnetic field. The first and second operative magnetic fields are described in more detail below with relation to magnet holder 26 and hub 54.

Both cuff 24 and magnet holder 26 operate with respect to hub 54 and the structures defined by hub 54. As such, the mode of operation of cuff 24 and magnet holder 26 will be described, at least in part, with respect to hub 54. As previously discussed, magnet holder 26 is positioned at least partially within magnet holder channel 66 of hub 54 and transitions from a first position to a second position within magnet holder channel 66. Magnet holder channel 66 and cuff channel 70 are at least partially connected such that magnet holder 26 is at least partially positioned within cuff channel 70 (e.g., lateral portions 67 including second and third magnet receivers 92, 94 and their corresponding lock indicator permanent magnets 93, 95). When cuff 24 is positioned with hub 54 such that extension portions including first and second extension portions 102, 104 are positioned in cuff channel 70 of interior hub 54, the first and second operative magnetic fields are at least partially within cuff channel 70.

Referring to FIGS. 6 and 10, in one example, first and second permanent magnets 106*a*, 106*b* of cuff 24 generate the first operative magnetic field when the north poles of first and second permanent magnets 106*a*, 106*b* of cuff 24 face substantially toward each other in cuff channel 70. Third and fourth permanent magnets 108*a*, 108*b* of cuff 24 generate the second operative magnetic field when the south poles of third and fourth permanent magnets 108*a*, 108*b* of cuff 24 are facing substantially toward each other in cuff channel 70. First and second magnetic fields are longitudinally spaced from each other and form opposite magnetic fields. Magnet holder 26 includes second and third lock indicator permanent magnets 93, 95 that form the lock indicator magnetic field where second and third lock indicator magnets 93, 95 are oriented such that the north and south poles are generally oriented in the same direction, essentially forming the lock indicator magnetic field with a unitary north pole and a unitary south pole substantially tangential to the arcuate path of cuff channel 70. When magnet holder 26 is in the first position, second and third lock indicator magnets 93, 95 interact with the first operative magnetic field. Because the north poles of first and second permanent magnets 106*a*, 106*b* are oriented inward, the unitary south pole of lock indicator magnetic field of magnet holder 26 is attracted to the north pole of one of first and second permanent magnets 106*a*, 106*b* on one end of the lock indicator magnetic field and is repelled by the north pole of the other permanent magnet of first and second permanent magnets 106*a*, 106*b* on the other end of the lock indicator magnetic field. Because cuff 24 rotates relative to hub 54, the attractive and repulsive forces of the lock indicator magnetic field and the first operative magnetic field of cuff 24 cause cuff 24 to rotate in a first direction. When magnet holder 26 is transitioned from the first position to the second position, cuff 24 rotates in the opposite, second direction as the lock indicator magnetic field of magnet holder 26 interacts with the second operative magnetic field formed by the south poles of third and fourth permanent magnets 108*a*, 108*b* that are oriented inward. Similar effects may be achieved by altering the directions of the poles in a number of ways. Generally, magnet holder 26 interacts with cuff 24 such that when magnet holder 26 transitions into a first longitudinal position, cuff 24 rotates within the cuff channel 70 in a first direction and when magnet holder 26 transitions into a second longitudinal position, cuff 24 rotates within cuff channel 70 in a second direction. A spring clip or radial detent associated with hub 54 may be utilized to hold the axial position of cuff 24 relative to hub 54, i.e., may restrict cuff 24 from axial displacement relative to hub 54 along hub longitudinal axis 75. The magnet attraction between cuff 24 and magnet holder 26 may also hold the axial position of cuff 24 relative to hub 54.

Hub 54, cuff 24, and magnet holder 26 may all be designed such that second and third lock indicator magnets 93, 95 never contact permanent magnets 106, 108 of cuff 24. For example, referring to FIG. 5, hub 54 includes stop channels 69 that receive retainers 32 extending from lock indicator assembly 20 (e.g., extending from flag 22 as shown in FIG. 3). Stop channels 69 are dimensioned such that retainers 32 transition between a first position and a second position associated with displaying a lock status and an unlock status (see also FIG. 6) and limit rotation of flag 22 and cuff 24 (flag 22 and cuff 24 are rotationally constrained relative to each other) beyond the first and second position. The first and second positions defined by stop channels 69 and retainers 32 allow cuff 24 to be positioned such that extension portions 102, 104 and more specifically permanent magnets 106, 108 are limited from contacting second and third lock indicator magnets 93, 95 of magnet holder 26. For example, permanent magnets 106, 108 are spaced from second and third lock indicator magnets 93, 95 when cuff 24 is in the first or second position associated with the locked status and the unlocked status. Including an arcuate spacing of the magnets of cuff 24 and magnet holder 26 allows magnet holder 26 to transition between the first position and the second position more easily without becoming detached from magnetic coupling with engagement portion 53 of the locking lug 52. When egress handle 14 is actuated, locking lug 53 is rotated such that magnet holder 26 and lock indicator engagement portion 53 of locking lug 52 of locking assembly 50 are magnetically decoupled from each other. When egress handle 14 returns to a neutral position, magnet holder 26 and engagement portion 53 of the locking lug 52 of the locking assembly 50 are able to magnetically recouple as locking lug 52 is also returned to the neutral position (e.g., via a bias to the neutral position). As magnet holder 26 magnetically couples and decouples to and from locking lug 52, the lock status displayed by lock indicator assembly 20 remains unchanged.

Turning now to a discussion of the other components of lock indicator assembly 20, flag 22 is operably coupled to cuff 24, such that as cuff 24 is actuated between a first and second position, flag 22 likewise moves with cuff 24. As shown in FIGS. 2 and 3, flag 22 includes retainer 32 and indicator portion 34. Retainer 32 engages with cuff 24 such that flag 22 follows the rotational movement of cuff 24. In some embodiments, retainer 32 includes a plurality of posts that extend from body 36 of cuff 24. Retainer 32 engages with cuff 24 in order to rotationally constrain retainer 32 relative to cuff 24. In some embodiments, retainer 32 extends into post channels 101 in cuff 24. Post channels 101 allow posts to be positioned within post channels 101 at various longitudinal positions while still rotationally constraining retainer 32 relative to cuff 24.

Indicator portion 34 includes lock indicator 35*a* and unlock indicator 35*b*. Lock indicator 35*a* and unlock indicator 35*b* may include various visual indications signaling to an observer the lock condition of door lock 12 (e.g., red and green signaling lock and unlock conditions, padlock symbol in locked and unlocked positions, the words "locked" and "unlocked"). Lock indicator 35*a* and unlock indicator 35*b* are positioned spaced from each other at an angular distance relative to longitudinal axis 75, the angular distance being equal to the angular distance cuff 24 and flag 22 travel in response to actuation by magnet holder 26. Optionally, flag 22 includes two of each of lock indicator 35*a* and unlock indicator 35*b*, where two lock indicators 35*a* are spaced 180 degrees from each other and two unlock indicators 35*b* are spaced 180 degrees from each other such that when flag 22 is installed, the like symbols may be seen from two positions (e.g., top and bottom, left and right side of door lock 12).

Referring again to FIGS. 2 and 3, lock indicator assembly 20 includes rose 28 and rose liner 30. Rose liner 30 is coupled to hub 54. For example, rose liner 30 includes rose liner threaded portion 118 that engages hub threaded portion 56. As rose liner 30 is threaded onto hub threaded portion 56 of hub 54, rose liner 30 can be adjusted to be positioned proximate or abutting door 10, allowing rose liner 30 to be adjusted to varying thicknesses of various doors. Rose liner 30 includes coupling portion 120 to limit rotation of rose liner 30 relative to door 10 when engaged. In some embodiments, coupling portion 120 of rose liner 30 can only be engaged at predefined positions (e.g., vertical or horizontal positions). As rose liner 30 is threaded onto hub 54, distance between rose liner 30 and door 10 is adjusted. Once the appropriate distance between rose liner 30 and door 10 is achieved, rose liner 30 is secured in place via coupling portion 120. Coupling portion 120 is coupled to door 10 or to hub 54. Coupling portion 120 rotationally constrains rose liner 30 such that rose liner 30 is blocked from being threaded or unthreaded on the hub 54.

Referring to FIGS. 2 and 7, rose 28 is coupled to rose liner 30 (e.g., press fit) to form rose space 122 within which portions of flag 22 are positioned in operation. Flag 22 rotates within rose space 122. Rose 28 includes window apertures 110 through which lock and unlock indicators 35*a*, 35*b* of flag 22 are visible, where lock and unlock indicators 35*a*, 35*b* correspond to the window apertures 110. Lens 112 is secured to rose 28, with windows 114 protruding through window apertures 110. An adhesive may be employed to affect such securement. Rose 28, rose liner 30, flag 22 and lens 112 can be considered to be a rose assembly or subassembly.

Referring to FIG. 7, flag 22 maintains a fixed distance from rose 28 such that flag 22 is visible through lens 112 and window aperture 110. Flag 22 includes lip 23 that engages with rose liner 30. Lip 23 of flag 22 maintains a fixed distance relative to rose 28 when rose 28 is secured to rose liner 30. Furthermore, regardless of the relative positions of rose liner 30 and hub 54, the longitudinal position of cuff 24 remains consistent relative to hub 54 and longitudinal position of flag 22 remains consistent relative to rose 28. As previously discussed, flag 22 includes retainer 32 which rotationally constrains flag 22 with respect to cuff 24 while allowing flag 22 to be positioned at varying distances from cuff 24. Because door thicknesses vary and rose liner 30 is adjustable to accommodate the varying door thickness, and because coupling portion 32 of flag 22 is able to extend into post channels 101 of cuff 24, flag 22 is rotationally constrained without having to manufacture different door locks to accommodate various door thicknesses. Retainer 32 has a length measured along hub longitudinal axis 75 that is longer than the axial distance between the opposite extreme positions of rose 28 relative to hub 54. Optionally, a spring (not shown) is positioned in rose space 122 to bias flag 22 away from rose liner 30 toward rose 28. A spring may also, optionally, be positioned between cap 100 of cuff 24 and rose 28 to maintain the position of cuff 24 relative to hub 54 along hub longitudinal axis 75.

In some embodiments, rose 28 is shaped to include a frustoconical shape. Flag 22 may include a similar shape. The frustoconical shape improves visibility of flag 22 through rose 28 by angling lock and unlock indicators 35*a*, 35*b*. As many door locks are not positioned at eye level, this allows people to view flag from above or below more conveniently when window apertures 110 are positioned on rose 28 vertically above and below hub 54. Similarly, window apertures 110 may be placed at horizontal positions relative to cuff 24 to provide a wider viewing angle.

Additional details of lock indicator assemblies and associated locks can be found in U.S. Provisional Patent Application No. 63/033,034, filed Jun. 1, 2020 and the U.S. utility application entitled CYLINDRICAL LOCK STATUS INDICATOR and filed on even date herewith, the entire disclosure of each of which are hereby incorporated by reference in their entireties.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A lock comprising:

a hub having a hub longitudinal axis;

a moveable cuff capable of undergoing a movement between a first cuff position and a second cuff position, the movement of the moveable cuff guided by the hub;

a flag having a lock indicator and an unlock indicator, the flag moveable by the cuff between a lock flag position displaying the lock indicator and an unlock flag position displaying the unlock indicator, the movement of the moveable cuff actuating the flag between the lock flag position and the unlock flag position;

a rose at least partially covering the flag, the rose selectively securable relative to the hub during installation of the lock in a first rose position and selectively securable to the hub during installation of the lock in a second rose position spaced a distance from the first rose position along the hub longitudinal axis, whereby the rose is positioned in one of the first rose position and the second rose position at installation of the lock and after installation the rose is fixed in the selected one of the first rose position and the second rose position, the flag secured for movement with the rose between a first flag position and a second flag position spaced from the first flag position along the hub longitudinal axis, the cuff spaced a first distance along the hub longitudinal axis from the lock indicator and the unlock indicator in the first flag position, the cuff spaced a second distance larger than the first distance along the hub longitudinal axis from the lock indicator and the unlock indicator in the second flag position, the moveable cuff operable to actuate the flag between the lock position and the unlock position in both the first flag position and the second flag position; and a rose liner, the rose liner selectively securable to the rose, the rose liner selectively securable relative to the hub during installation of the lock in a first rose liner position and selectively securable to the hub during installation of the lock in a second rose liner position spaced from the first rose liner position along the hub longitudinal axis, the rose securable to the rose liner, with the rose secured to the rose liner and the rose liner maintaining the first rose liner position, the rose maintains the first rose liner position, with the rose secured to the rose liner and the rose liner maintaining the second rose liner position, the rose maintains the second rose liner position, the flag sandwiched between the rose liner and the rose.

2. The lock of claim 1, further comprising:

a locking lug having a locking lug lock position corresponding to a locked condition of the lock, in the locking lug lock position the hub restricting a movement of the locking lug relative to the hub, the locking lug having a locking lug unlock position corresponding to an unlocked condition of the lock, in the locking lug unlock position the hub allowing the movement of the locking lug relative to the hub, the locking lug axially translatable along the hub longitudinal axis between the locking lug lock position and the locking lug unlock position; and a magnet holder, the magnet holder moveable by the locking lug through a magnet holder movement between a magnet holder lock position and a magnet holder unlock position, the moveable cuff magnetically actuatable by the magnet holder between the first cuff position and the second cuff position, the magnet holder movement actuating the moveable cuff between the first cuff position and the second cuff position.

3. The lock of claim 1, wherein the rose liner is threadedly connected to the hub, the rose liner rotatable relative to the hub during installation of the lock between the first rose liner position and the second rose liner position.

4. The lock of claim 1, wherein the rose comprises a window, the lock indicator visible through the window in the lock flag position, the unlock indicator visible through the window in the unlock flag position.

5. The lock of claim 1, wherein the cuff is constrained against axial movement along the hub longitudinal axis.

6. The lock of claim 1, wherein the movement of the moveable cuff comprises a rotation about the hub.

7. The lock of claim 6, wherein the flag comprises a retainer rotationally constraining the flag to the cuff, the retainer having a length measured along the hub longitudinal axis, the length of the retainer longer than the distance between the first rose position and the second rose position.

8. A lock comprising:

a hub having a hub longitudinal axis;

a moveable cuff constrained against axial movement relative to the hub longitudinal axis, the moveable cuff rotatable about the hub longitudinal axis and capable of undergoing a movement between a first cuff position and a second cuff position;

a flag having a lock indicator and an unlock indicator, the flag moveable by the cuff between a lock flag position displaying the lock indicator and an unlock flag position displaying the unlock indicator, the movement of the moveable cuff actuating the flag between the lock flag position and the unlock flag position; and a rose at least partially covering the flag, the rose selectively securable relative to the hub during installation of the lock in a first rose position and selectively securable to the hub during installation of the lock in a second rose position spaced a distance from the first rose position along the hub longitudinal axis, whereby the rose is positioned in one of the first rose position and the second rose position at installation of the lock and after installation the rose is fixed in the selected one of the first rose position and the second rose position, the flag secured for movement with the rose between a first flag position and a second flag position spaced from the first flag position along the hub longitudinal axis, the cuff spaced a first distance along the hub longitudinal axis from the lock indicator and the unlock indicator in the first flag position, the cuff spaced a second distance larger than the first distance along the hub longitudinal axis from the lock indicator and the unlock indicator in the second flag position, the moveable cuff operable to actuate the flag between the lock position and the unlock position in both the first flag position and the second flag position; and a rose liner, the rose liner selectively securable to the rose, the rose liner selectively securable relative to the hub during installation of the lock in a first rose liner position and selectively securable to the hub during installation of the lock in a second rose liner position spaced from the first rose liner position along the hub longitudinal axis, the rose securable to the rose liner, with the rose secured to the rose liner and the rose liner maintaining the first rose liner position, the rose maintains the first rose liner position, with the rose secured to the rose liner and the rose liner maintaining the second rose liner position, the rose maintains the second rose liner position, the flag sandwiched between the rose liner and the rose.

9. The lock of claim 8, further comprising:

a locking lug having a locking lug lock position corresponding to a locked condition of the lock, in the locking lug lock position the hub restricting a movement of the locking lug relative to the hub, the locking lug having a locking lug unlock position corresponding to an unlocked condition of the lock, in the locking lug unlock position the hub allowing the movement of the locking lug relative to the hub, the locking lug axially translatable along the hub longitudinal axis between the locking lug lock position and the locking lug unlock position; and a magnet holder, the magnet holder moveable by the locking lug through a magnet holder movement between a magnet holder lock position and a magnet holder unlock position, the moveable cuff magnetically actuatable by the magnet holder between the first cuff position and the second cuff position, the magnet holder movement actuating the moveable cuff between the first cuff position and the second cuff position.

10. The lock of claim 8, wherein the rose liner is threadedly connected to the hub, the rose liner rotatable relative to the hub during installation of the lock between the first rose liner position and the second rose liner position.

11. The lock of claim 8, wherein the rose comprises a window, the lock indicator visible through the window in the lock flag position, the unlock indicator visible through the window in the unlock flag position.

12. The lock of claim 8, wherein the cuff is constrained against axial movement along the hub longitudinal axis.

13. The lock of claim 8, wherein the movement of the moveable cuff comprises a rotation about the hub.

14. The lock of claim 13, wherein the flag comprises a retainer rotationally constraining the flag to the cuff, the retainer having a length measured along the hub longitudinal axis, the length of the retainer longer than the distance between the first rose position and the second rose position.

15. A method of installing a lock on a door, the lock including a hub having a longitudinal axis, a moveable cuff capable of undergoing a movement between a first cuff position and a second cuff position, the movement of the moveable cuff guided by the hub, a flag having a lock indicator and an unlock indicator, the flag moveable by the cuff between a lock flag position displaying the lock indicator and an unlock flag position displaying the unlock indicator, the movement of the moveable cuff actuating the flag between the lock flag position and the unlock flag position, a rose at least partially covering the flag, the flag secured for movement with the rose between a first flag position and a second flag position spaced from the first flag position along the hub longitudinal axis, the cuff spaced a first distance along the hub longitudinal axis from the lock indicator and the unlock indicator in the first flag position, the cuff spaced a second distance larger than the first distance along the hub longitudinal axis from the lock indicator and the unlock indicator in the second flag position, the moveable cuff operable to actuate the flag between the lock position and the unlock position in both the first flag position and the second flag position, and a rose liner selectively securable to the rose, the method comprising the steps of:

positioning the hub on the door;

selectively coupling the rose liner to the hub in a first rose liner position;

selectively coupling the rose liner to the hub in a second rose liner position spaced from the first rose liner position along the hub longitudinal axis;

selecting one of the first rose liner position and the second liner position; and securing the rose to the rose liner, with the rose secured to the rose liner and the rose liner maintaining the first rose liner position, the rose maintains a first rose position, and with the rose secured to the rose liner and the rose liner maintaining the second rose liner position, the rose maintains a second rose position, the flag sandwiched between the rose liner and the rose.

16. The method of claim 15, wherein the rose liner is threadedly coupled to the hub, the rose liner rotatable relative to the hub during installation of the lock between the first rose liner position and the second rose liner position.

17. The method of claim 15, wherein the rose is press-fit to the rose liner.

* * * * *